2 Sheets—Sheet 2.
A. S. McDERMOTT.
CULTIVATOR.
No. 191,606. Patented June 5, 1877.
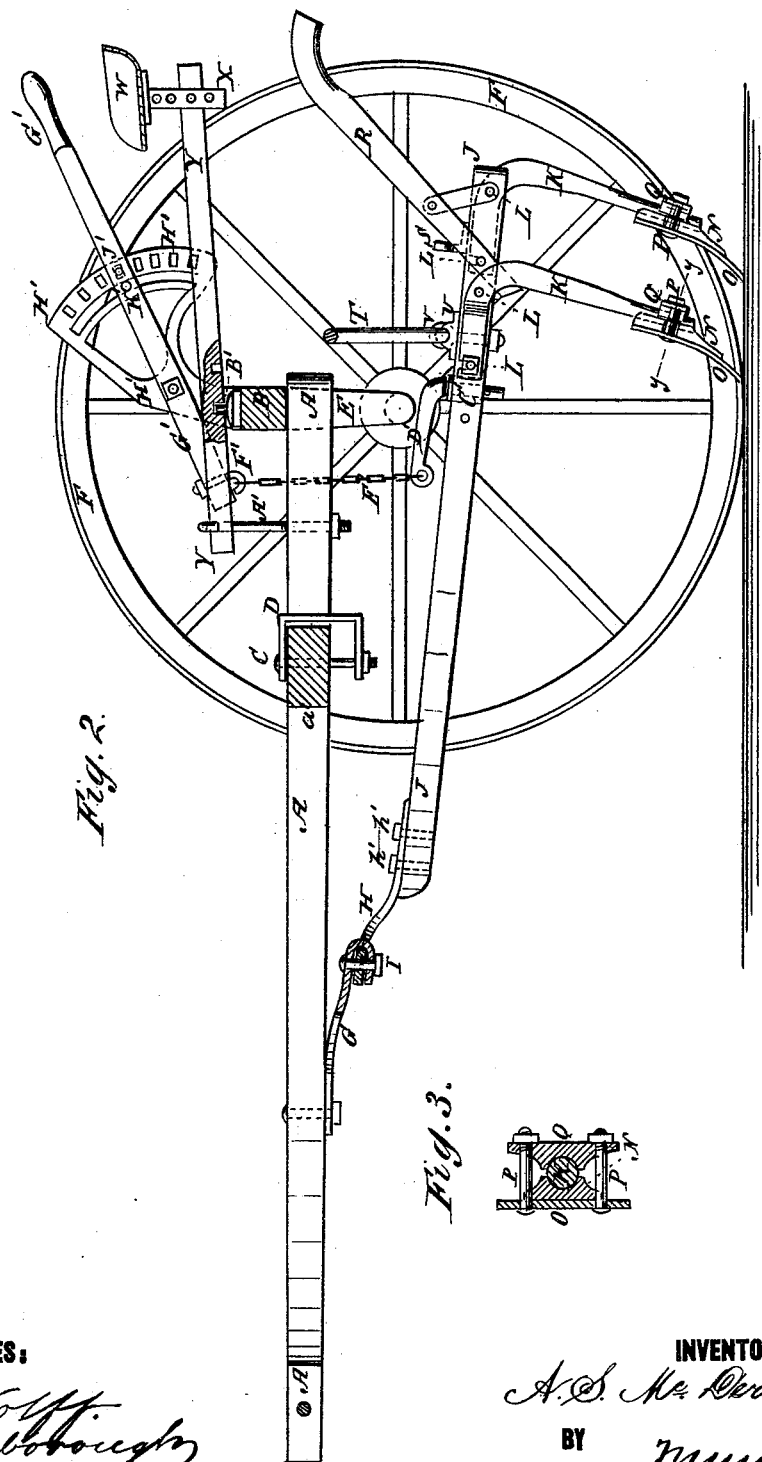
WITNESSES:
INVENTOR:
A. S. McDermott.
BY
ATTORNEYS.

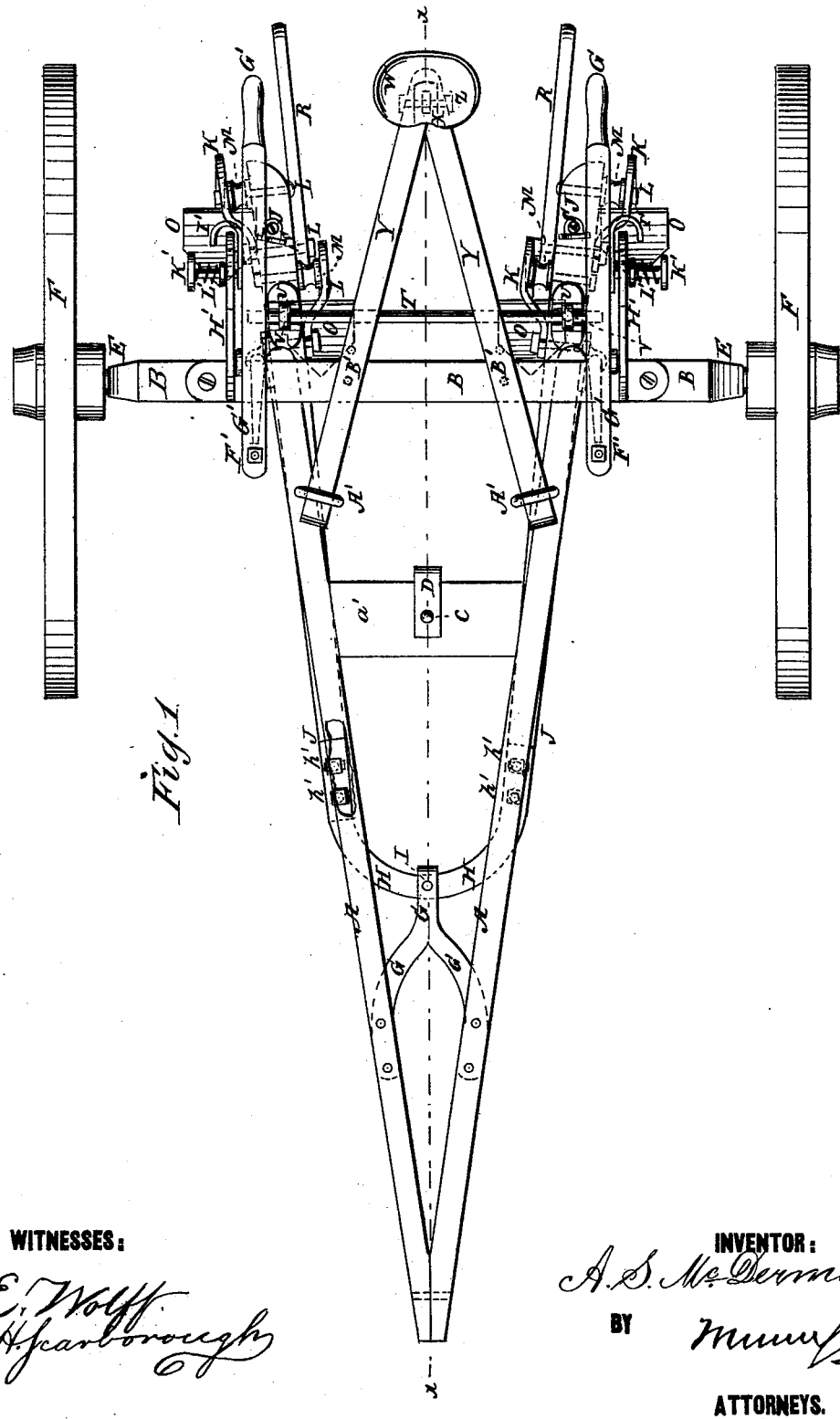

UNITED STATES PATENT OFFICE.

AUSTIN S. McDERMOTT, OF PRAIRIE CREEK, (MELLERAY P. O.,) IOWA.

IMPROVEMENT IN CULTIVATORS.

Specification forming part of Letters Patent No. 191,606, dated June 5, 1877; application filed January 29, 1877.

*To all whom it may concern:*

Be it known that I, AUSTIN SYLVESTER McDERMOTT, of Prairie Creek, (Melleray P. O.,) in the county of Dubuque and State of Iowa, have invented a new and useful Improvement in Cultivators, of which the following is a specification:

Figure 1, Sheet 1, is a top view of my improved cultivator. Fig. 2, Sheet 2, is a vertical longitudinal section of the same, taken through the line $xx$, Fig. 1. Fig. 3, Sheet 2, is a detail cross-section of the device for securing the plows to the standards, taken through the line $yy$, Fig. 2.

Similar letters of reference indicate corresponding parts.

The object of this invention is to furnish an improved cultivator which shall be simple in construction, readily adjusted as the character of the work to be done may require, and easily guided and controlled.

The invention will first be described in connection with the drawing, and then pointed out in the claim.

A is the tongue of the machine, which is made in V shape, and its rear end is attached to the axle B.

The arms of the tongue A are connected by a cross-bar, $a'$, to which the double-tree is pivoted by the hammer-bolt C.

To the ends of the axle B are attached, or upon them are formed, crank-axle arms E, upon the journals of which the wheels F revolve.

To the arms of the tongue A, near the forward end of said tongue, are bolted the ends of the forward arms of the three-armed bar G, the third arm of which projects to the rearward, and its rear end is bent into U form to receive the curved bar H.

The bar H is pivoted to the bar G by a bolt, I, that passes through the bend of the bar G, and through the center of the bar H.

The ends of the curved bar H are secured to the forward ends of the beams J, by bolts $h'$, two to each end.

To the rear ends of the beams J are attached handles R, which may be strengthened by braces, and are designed for use in guiding the plows when the machine is used as a walking-cultivator.

To the rear ends of the plow-beams J are attached forked brackets S, to receive the feet of the driver and enable him to guide the plows with his feet.

The rear parts of the plow-beams J are connected by a bar, T, the middle part of which is arched, and its end parts are straight.

W is the driver's seat, which is attached to the upper end of the standard X.

To the outer sides of the rear parts of the beams J are attached sockets $C'$, in which work cranks $D'$, to the outer ends of which are attached chains $E'$, which are hooked upon the hooks of hook-bolts $F'$, attached to the forward ends of the levers $G'$.

The cranks $D'$ prevent the plows from being raised out of the ground as they are moved from one side to the other, which is not the case when they are swung from chains attached to the beams.

The levers $G'$ are pivoted to the sides of the standards $H'$, the lower ends of which are secured to the axle B by bolts, so that by loosening the nuts of the said bolts the standards may be adjusted to spread the levers according to the length of the operator's arms.

This construction also enables the standard $H'$ to be so adjusted that the forward ends of the levers $G'$ may be directly over the ends of the cranks $D'$ when the beams are moved closer together or farther apart.

The upper ends of the standard $H'$ are made wide, project to the rear, and their upper edges are formed upon the arcs of circles, having their centers in the pivots of the levers $G'$, so that the said edges may move through open or U-shaped keepers $I'$, attached to the said levers $G'$.

The inner arms of the keepers $I'$ are attached to the levers $G'$, and serve as rub-plates, and to them are attached projections or catches $J'$, which pass through holes in the upper ends of the standards $H'$ to lock the said levers in place when adjusted.

To the levers $G'$ are attached pins $K'$, which pass through curved slots in the standards $H'$, and have spiral springs $L'$ placed upon their outer ends to hold the said levers $G'$ against the said standards $H'$, to keep the catches $J'$ in place in said standards $H'$. The levers $G'$ can be operated to raise and lower the plows by moving them sidewise to withdraw the catches, and then moving the said levers in the proper direction. The pivoting of the cranks D' and the standards H' prevents them and the levers G' from interfering with the movements of the plow-beams J.

It will be observed that the levers G' are entirely independent of each other, so that either side may be regulated should its wheel get into a furrow or low place.

Having thus described my invention, I claim as new and desire to secure by Letters Patent—

The combination of the sockets C', the cranks D', the chains E', the levers G', the pivoted standards H', the keepers and catches I' J', and the pins and springs K' L', with the plow-beams J and the axle B, substantially as herein shown and described.

AUSTIN S. McDERMOTT.

Witnesses:
F. T. WALKER,
P. McCULLAUGH.